United States Patent Office

3,671,213
Patented June 20, 1972

3,671,213
HERBICIDAL COMPOSITIONS
Brian Graham White, Bracknell, England, assignor to Imperial Chemical Industries Limited, London, England
No Drawing. Filed July 5, 1968, Ser. No. 742,482
Claims priority, application Great Britain, July 10, 1967, 31,669/67
Int. Cl. A01n 9/22
U.S. Cl. 71—94   3 Claims

ABSTRACT OF THE DISCLOSURE

Complexes of a herbicidal bipyridylium quaternary salt having 1-4 molecular proportions of a complexing agent are provided. The complexing agent has a nucleus which is aromatic or heterocyclic and bears at least 1 substituent of hydroxy, amino nitro, carboxyl or mercapto. The bipyridylium salt which is complexed is applied to inhibit the growth of vegetation.

---

This invention relates to processes for killing plants and to compositions comprising a bipyridylium quaternary salt for use therein. Bipyridylium salt herbicides have previously been made available for use in the form of aqueous solutions containing wetting agents and/or corrosion inhibitors, as described in British Pats. Nos. 813,531 and 913,413.

According to the present invention we provide a process of killing or severely damaging plants, which comprises applying to the plants a complex of a herbicidal bipyridylium quaternary salt with from 1 to 4 molecular proportions of a complexing agent comprising a compound having an aromatic or heterocyclic nucleus bearing one or more hydroxy, amino or mercapto substituents. Preferably, the number of substituents borne by the complexing agent is from one to three. Conveniently, the complexing agent contains a benzene, naphthalene, or pyridine ring.

In another aspect, the invention provides a solid complex of a herbicidal bipyridylium quaternary salt with from 1 to 4 molecular proportions of a complexing agent comprising a compound having an aromatic or heterocyclic nucleus bearing one or more hydroxy, amino, or mercapto substituents, and being other than p-phenylene diamine, hydroquinone, or aniline.

The complexes can be obtained as solid crystalline materials and are generally coloured from yellow to black.

Examples of herbicidal bipyridylium salts forming such complexes include the following:

1,1'-ethylene-2,2'-bipyridylium dibromide
1,1'-dimethyl-4,4'-bipyridylium dichloride
1,1'-di-2-hydroxyethyl-4,4'-bipyridylium dichloride
1,1'-bis-3,5-dimethylmorpholinocarbonylmethyl-4,4'-bipyridylium dichloride
1-(2-hydroxyethyl)-1'-methyl-4,4'-bipyridylium dichloride
1,1'-di-carbamoylmethyl-4,4'-bipyridylium dichloride
1,1'-di-N-methylcarbamoylmethyl-4,4'-bipyridylium dichloride
1,1'-bis-N,N-dimethylcarbamoylmethyl-4,4'-bipyridylium dichloride
1,1'-bis-N,N-diethylcarbamoylmethyl-4,4'-bipyridylium dichloride
1,1'-diacetonyl-4,4'-bipyridylium dichloride
1,1'-diethoxycarbonylmethyl-4,4'-bipyridylium dibromide
1,1'-diallyl-4,4'-bipyridylium dibromide The bipyridylium salts listed above are all chlorides or bromides, in which form they are most commonly encountered. However, many other salts, for example the iodide, methylsulphate, nitrate, phosphate, sulphate, p-toluenesulphonate, phenolate, or thiophenolate may be employed in forming the complexes of the invention.

In general the complexing agent may comprise any aromatic or heterocyclic nucleus and preferred such nuclei include, for example, those derived from benzene, naphthalene and pyridine. Whilst there may be present in the complexing agent one or more hydroxy, amino or mercapto groups, in general from one to three such groups are preferred. It is not necessary in the case when two or more such groups are present for these to be identical and preferred complexing agents include compounds bearing, for example, one hydroxy substituent and one amino substituent, or an amino substituent and a mercapto group. Other substituent groups may also be present in the complexing agent and a particularly preferred such group is the carboxylic group, —COOH.

The following complexing agents are, for example, particularly suitable for the complexes of this invention:

p-aminophenol
catechol
phloroglucinol
3,4-dihydroxybenzoic acid
p-aminobenzoic acid
α-naphthylamine
o-aminobenzenethiol
2-mercaptopyridine
2-mercaptobenzimidazole The complexes are conveniently obtained by adding a complexing agent, in at least the stoichiometric quantity necessary to form the complex, to an aqueous or alcoholic solution of the bipyridylium salt. Suitable alcohols include methanol and ethanol. The temperature of the solution may be between 0° C. and the boiling point of the solvent but is conveniently the temperature of the room in which the preparation is carried out.

In order to obtain the solid complexes, or compositions comprising them, directly, that is without the need for concentrating reaction liquors by evaporation, operations are preferably carried out with liquors having a bipyridylium ion concentration of between about 20 to 40%, using, if necessary, an amount of complexing agent in excess of the stoichiometric amount.

It is often desirable to incorporate a suitable wetting agent in bipyridylium herbicides, and in the present instance such wetting agents may be added to the hot aqueous bipyridylium salt solution before the addition of the complexing agent.

Crystallisation occurs on cooling, but is rather slow when using dilute aqueous liquors.

The invention complexes often incorporate water originally present in the bipyridylium salt solution as lattice hydration. Generally they can be pressed sufficiently free from residual water to yield an easily handleable crystalline product.

If desired the solid complex may be freed from water by conventional drying techniques; for example, drying for a few hours at 100° C. proves sufficient in some cases to cause virtually complete dehydration. This is important where solids containing a high concentration of bipyridylium ion are required, so that the cost of bulk transport may be minimised. Thus, for example, 30% aqueous solutions of 1,1'-dimethyl-4,4'-bipyridylium ion can be converted into solid formulations with very little reduction in ion concentration when a small excess of complexing agent is used, and moreover, in some cases, by a correct choice of complexing agent, with an increase in ion concentration when the stoichiometric quantity is used. The materials resulting from such treatments are very easily handled, free running systems, which dissolve quite readily in cold water in the proportion required for most applications.

If desired, the solid complexes may be diluted with inert fillers and suitable inert fillers include potassium chloride, potassium nitrate, sodium sulphate, magnesium sulphate and sucrose.

Solid complexes associated with inert filler may be prepared by adding, if desired, a surfactant to a hot aqueous bipyridylium salt solution, and then adding the solid complexing agent and a solid inert filler, and maintaining the mixture at an elevated temperature until all solid matter dissolves. The solution is then cooled.

The quantities of complexing agent and inert filler which are added may be varied depending upon the complex and filler system being used.

Particularly good results are obtainable when using the lower hydrated and anhydrous forms of hydrate-forming salts, e.g. magnesium sulphate, as fillers.

When formulations comprising bipyridylium salt liquor, magnesium sulphate and complexing agent are prepared and then allowed to stand in open shallow dishes, solidification can occur very rapidly, for example in less than five minutes. In this fashion solid blocks of material are obtainable. By varying the quantities of magnesium sulphate added the hardness of these blocks can be varied; thus the lower the quantity of magnesium sulphate added, the softer the block.

If during the cooling process the surface of the solution is agitated, small granules are formed.

These solid compositions can, if desired, be freed from water by conventional drying techniques.

The formulations produced with magnesium sulphate, with or without drying, dissolve readily in cold water and more rapidly in warm water. Moreover, both dried and undried treatments yield easily handleable yellow-deep red solids, with bipyridylium ion concentration of the order of 20–30% by weight. With drying the ion concentration may be increased, up to about 35%.

The invention is illustrated by the following examples.

EXAMPLE 1

This example illustrates the preparation of 1,1'-dimethyl-4,4'-bipyridylium dichloride:p-aminophenol (1:2) having the formula:

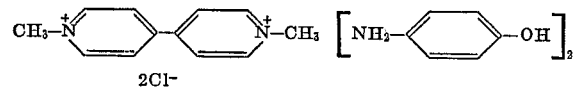

1,1'-dimethyl-4,4' - bipyridylium dichloride (2.57 g.) in warm methanol (10 mls.) was added to p-aminophenol (1.09 g.) in boiling ethanol (15 mls.). A purple solution resulted which deposited a purple solid upon cooling. This was recrystallised from ethanol, M.P. 150° C.

EXAMPLE 2

This example illustrates the preparation of 1,1'-dimethyl-4,4'-bipyridylium dichloride:catechol (1:1) having the formula:

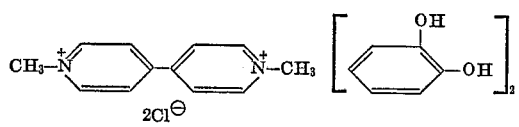

1,1'-dimethyl-4,4' - bipyridylium dichloride (1.0 g.) in methanol (5 mls.) was added to catechol (2.0 g.) in ethanol (5.0 mls.). A deep red solution formed which deposited red crystals immediately, and further crops on standing. The complex was recrystallised from methanol, M.P. 200–215° C.

EXAMPLE 3

This example illustrates the preparation of 1,1'-dimethyl-4,4'-bipyridylium dichloride:phloroglucinol (1:3) having the formula:

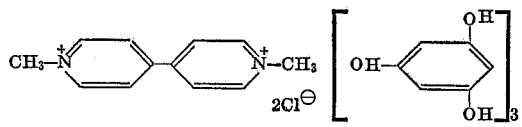

1,1'-dimethyl-4,4' - bipyridylium dichloride (1.0 g.) in methanol (10 mls.) was added to phloroglucinol (2.0 g.) in warm methanol (10 mls.). A deep red solution formed depositing deep red crystals upon cooling. The product was recrystallised from methanol, M.P. 106° C.

EXAMPLE 4

This example illustrates the preparation of 1,1' - dimethyl-4,4'-bipyridylium dichloride:3,4-dihydroxybenzoic acid (1:1) having the formula:

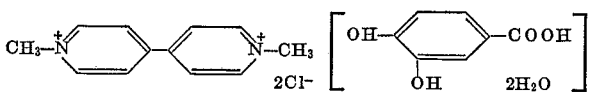

3,4-dihydroxybenzoic acid (2.0 g.) dissolved in methanol—the minimum volume—was added to a solution of 1,1'-dimethyl-4,4' - bipyridylium dichloride (1.0 g.) in methanol (5 mls.). A deep orange solution formed depositing an orange red solid, which was recrystallised from ethanol/water, M.P. 194–196° C.

EXAMPLE 5

This example illustrates the preparation of 1,1'-di(2-hydroxyethyl) - 4,4' - bipyridylium dichloride:phloroglucinol (2:3) having the formula:

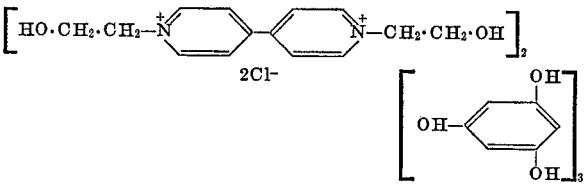

Phloroglucinol (1.22 g.) in ethanol (15 mls.) was added to a hot solution of 1,1'-di-(2-hydroxyethyl)4,4'-bipyridylium dichloride (1.60 g.) in a mixture of water and ethanol. A red solution depositing red crystals was formed immediately. The crystals were filtered off, recrystallised from ethanol with the minimum addition of water, and allowed to dry in vacuo, M.P. 242–243° C.

EXAMPLE 6

This example illustrates the preparation of 1,1'-di(3,5-dimethylmorpholinocarbonylmethyl) - 4,4' - bipyridylium dichloride:3,4-dihydroxybenzoic acid (1:2) having the formula:

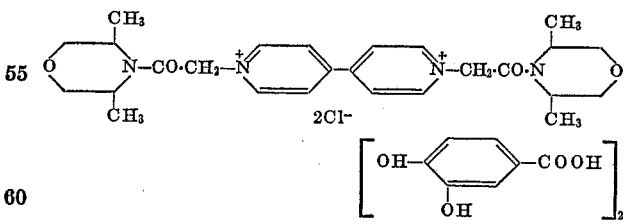

3,4-dihydroxybenzoic acid (1.54 g.) was dissolved in the minimum volume of hot ethanol. To this solution was added the bipyridylium salt in small increments, maintaining the mixture at reflux. A red solution was produced which yielded orange cystals on cooling. The crystals were recrystallised from ethanol, M.P. 180–184° C.

EXAMPLE 7

This example illustrates the preparation of the complex having the formula:

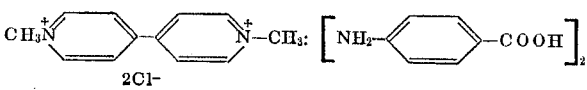

1,1'-dimethyl-4,4'-bipyridylium dichloride (1 g.) was added to a solution of p-aminobenzoic acid (2 g.) in ethyl alcohol (20 mls.), and the mixture was stirred, a few drops of methyl alcohol were added and the resultant solution was then heated under reflux. The solution turned a deep red colour and orange crystals separated out and were removed by filtration. The crystals were then dried and became deep red in colour. They were recrystallised from ethyl alcohol, M.P. 85° C. (ill-defined).

EXAMPLE 8

This example illustrates the preparation of the complex 1,1'-dimethyl-4,4'-bipyridylium dichloride:α-naphthylamine (1:4) having the formula:

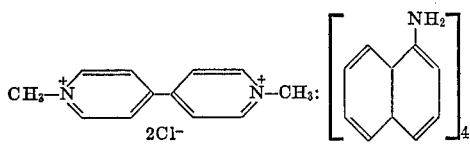

1,1'-dimethyl-4,4'-bipyridylium dichloride (1 g.) was dissolved in methyl alcohol (5 mls.) and the resultant solution was added to a solution of α-naphthylamine (2 g.) in ethyl alcohol (5 mls.). The solution immediately turned a dark blue colour and after stirring for 5 minutes, blue-black crystals were deposited. These were separated by filtration and recrystallised from ethyl alcohol, M.P. 149–150° C.

EXAMPLE 9

This example illustrates the preparation of the complex 1,1'-dimethyl-4,4'-bipyridylium dichloride:o-aminobenzenethiol having the formula:

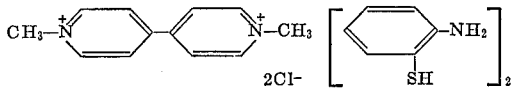

1,1'-dimethyl-4,4'-bipyridylium dichloride (2.6 g.) was added to a solution of o-aminobenzenethiol (2.5 g.) dissolved in ethyl alcohol (40 mls.) which was heated to reflux and a small amount of methyl alcohol (1–2 mls.) was added dropwise to the mixture until a brown solution was formed. The solution was then allowed to cool and brown crystals of the complex separated out, M.P. 102–105° C.

EXAMPLE 10

This example illustrates the preparation of the complex 1,1'-dimethyl-4,4'-bipyridylium dichloride:2 - mercaptobenzimidazole (1:2) having the formula:

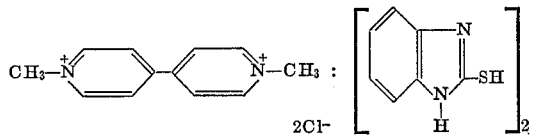

1,1'-dimethyl-4,4'-bipyridylium dichloride (2.6 g.) was added to a refluxing solution of 2-mercaptobenzimidazole (3.0 g.) in ethyl alcohol (40 mls.) and thereafter methyl alcohol (1–2 mls.) was added dropwise until the solution turned to deep red. The solution was then allowed to cool and deep red crystals of the complex separated out and were removed by filtration, M.P. 235–238° C.

EXAMPLE 11

This example illustrates the preparation of the complex 1,1'-dimethyl-4,4'-bipyridylium dichloride:p-aminophenol (1:2) by a method different from that of Example 1.

An aqueous 30% dication solution of 1,1'-dimethyl-4,4'-bipyridylium dichloride (2 mls.) was boiled and p-aminophenol added (0.7 g.). Purple crystals of the complex formed immediately and were removed by filtration.

EXAMPLE 12

This example illustrates the preparation of the complex having the formula:

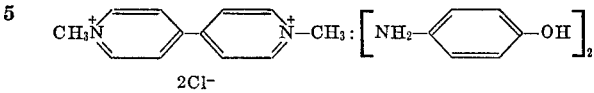

1,1'-dimethyl-4,4'-bipyridylium dichloride (1 g.) was added to a solution of p-aminophenol (1.75 g.) in boiling water.

On cooling the mixture set solid, and comprised crystals of the 1:2 complex mixed with additional complexing agent.

EXAMPLE 13

This example illustrates the preparation of the complex 1,1'-dimethyl-4,4'-bipyridylium dichloride:catechol by a method different from that described in Example 2.

An aqueous 30% dication solution of 1,1'-dimethyl-4,4'-bipyridylium dichloride (2 mls.) was boiled and catechol (1.75 g.) added at the boiling point. On cooling, a red solid comprising the complex was formed.

EXAMPLE 14

This example illustrates the preparation of the complex 1,1'-dimethyl-4,4'-bipyridylium dichloride:phloroglucinol (1:6) by a method different from that described in Example 3.

An aqueous 30% dication solution of 1,1'-dimethyl-4,4'-bipyridylium dichloride (2 mls.) was boiled and phloroglucinol (2.7 g.) was added. A yellow solid formed on cooling, which comprised the complex.

EXAMPLE 15

This example illustrates the preparation of the complex 1,1'-dimethyl-4,4'-bipyridylium dichloride:3,4-dihydroxybenzoic acid by a method different from that described in Example 4.

An aqueous 30% dication solution of 1,1'-dimethyl-4,4'-bipyridylium dichloride was boiled and 3,4-dihydroxybenzoic acid (2.0 g.) added at the boiling point. On cooling the solution set to a solid which was orange in colour and comprised the complex.

EXAMPLE 16

This example illustrates the preparation of 1,1'-dimethyl - 4,4' - bipyridylium diphloroglucinate:phloroglucinol (1:2) having the formula:

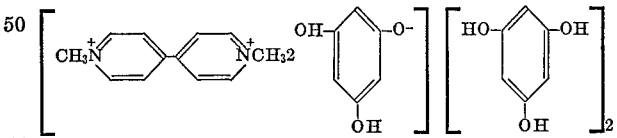

Phloroglucinol (7 g.) was dissolved in water (100 ml.) together with 1,1'-dimethyl-4,4'-bipyridylium dichloride (2.6 g.) and the solution treated with sodium carbonate (2.2 g.) in a little water. The solution deposited an orange solid which was collected; washed with water, and dried, giving 6 g. of the complex, M.P. 216° C.

EXAMPLE 17

This example illustrates the preparation of 1,1'-dimethyl-4,4'-bipyridylium di-p-nitrophenate:p-nitrophenol (1:2) having the formula:

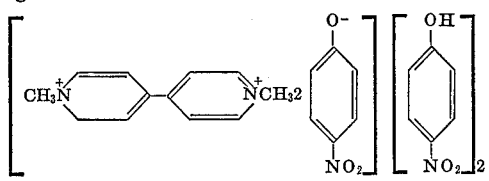

Sodium carbonate (2.2 g.) and p-nitrophenol (5.6 g.) were mixed in water (100 ml.) and warmed until a solution was obtained. A solution of 1,1'-dimethyl-4,4'-bipyridylium dichloride (2.6 g.) in a little water was then added slowly. The orange precipitate was collected and dried, giving the complex (5.5 g.), M.P. 181° C.

EXAMPLE 18

This example illustrates the preparation of complexes according to the invention and which contain magnesium sulphate as a filler. The complexes were those of Examples 1 to 4.

In each preparation, an aqueous 30% dication solution of 1,1'-dimethyl-4,4'-bipyridylium dichloride (2 mls.) was boiled and the appropriate amount of complexing agent added at the boiling point, and magnesium sulphate (4.0 g.) added before solidification.

In all cases, the resultant solids produced were very hard solid blocks but were found to dissolve fairly readily in water.

The resultant solids when dried in an oven at 75° C. overnight were rendered virtually anhydrous. They were attractively coloured.

| Complexing adduct: | Colour |
|---|---|
| p-Aminophenol | Purple. |
| Catechol | Orange-red. |
| Phloroglucinol | Yellow-brown. |
| 3,4-dihydroxybenzoic acid | Orange. |

The experiments were repeated using reduced amounts of magnesium sulphate (1 g.). The products obtained possessed a lesser degree of hardness.

The complexes of the present invention possess a number of important advantages over bipyridylium quaternary salts. Thus they are generally less corrosive towards metals than the latter. This reduced corrosivity is demonstrated by a comparative test carried out as follows:

A rectangular aluminium slide measuring approximately 3/2 inches by 1/4 inch was immersed to 2/3 of its length in a solution of the compound under test. Each test was carried out using a separate glass container in order to avoid electrolytic effects. The degree of corrosion caused by the test compounds in solution was assessed visually after 30 minutes. In the table below, the amount of corrosion caused by a solution of a bipyridylium salt complex has been expressed as a percentage of the corrosion caused by a solution of uncomplexed bipyridylium salt of the same concentration of dication. Thus, for example, the figure 5 opposite the p-aminophenol complex means that the solution of this complex caused corrosion to the extent of 5% of that produced by a solution of the uncomplexed bipyridylium ion of the same concentration of dication.

TABLE I

| Complex | Percentage concentration [1] | Amount of corrosion [2] |
|---|---|---|
| 1,1'-dimethyl-4,4'-bipyridylium dichloride: p-Aminophenol (1:2) | 5 | 5-10 |
| | 10 | 5 |
| 1,1'-dimethyl-4,4'-bipyridylium dichloride: Catechol (1:1) | 5 | 10 |
| | 10 | 10 |
| 1,1'-dimethyl-4,4'-bipyridylium dichloride: Phloroglucinol (1:3) | 5 | 5 |
| | 10 | 5 |
| 1,1'-dimethyl-4,4'-bipyridylium dichloride: 3,4-dihydroxybenzoic acid (1:1) | 5 | <5 |
| | 10 | <5 |
| 1,1'-dimethyl-4,4'-bipyridylium dichloride: p-aminobenzoic acid (1:2) | 5 | 15 |
| | 10 | 20 |
| 1,1'-dimethyl-4,4'-bipyridylium dichloride: α-Naphthylamine (1:4) | 5 | 10 |
| | 10 | 5 |
| 1,1'-dimethyl-4,4'-bipyridylium dichloride: o-Aminobenzenethiol (1:2) | 5 | 30 |
| | 10 | 50 |
| 1,1'-dimethyl-4,4'-bipyridylium dichloride: 2-mercaptopyridine (1:2) | 5 | 15 |
| | 10 | 20 |

[1] Bipyridylium dication in solution.
[2] As a percentage of that caused by uncomplexed bipyridylium salt.

It is evident from the above table that the complexes of the invention are substantially less corrosive than bipyridylium quaternary salts themselves.

Another important advantage is that when used as agents for killing plants, the complexes of this invention generally show improved biological efficiency in comparison with the uncomplexed compounds by way of a prolongation and enhancement of their herbicidal effect.

The procedure used in the tests for evaluating the phytotoxic effect of these compounds was as follows. An aqueous solution containing a wetting agent and the test compound was sprayed at the rate stated in the test table below onto a number of replicated cocksfoot plants. The damage to the plants was assessed visually at the intervals of time stated in the Test Tables and the figures recorded in the table represent the average damage to the plants and are entered as "percent control." The rates of application of the test compound are expressed in terms of pounds of dication per acre. For convenience the substance 1,1'-dimethyl-4,4'-bipyridylium dichloride is referred to simply by its common name—paraquat dichloride.

TABLE II

Test 1

| Compound or complex | Rate of application | Percent control after a period of— | | | | |
|---|---|---|---|---|---|---|
| | | 2 days | 1 week | 2 weeks | 3 weeks | 4 weeks |
| Paraquat dichloride | 1/50th | 49 | 69 | 71 | 73 | 60 |
| Paraquat dichloride:Catechol (1:1) | 1/50th | 84 | 85 | 87 | 91 | 90 |
| Paraquat dichloride:3,4-dihydroxybenzoic acid (1:1) | 1/50th | 81 | 85 | 86 | 90 | 89 |

Test 2

| Paraquat dichloride | 1/50th | 21 | 32 | 34 | 41 | 33 |
| Paraquat dichloride:3,4-dihydroxybenzoic acid (1:1) | 1/50th | 29 | 48 | 50 | 42 | 38 |
| Paraquat dichloride:Phloroglucinol (1:3) | 1/50th | 34 | 43 | 42 | 53 | 44 |
| Paraquat dichloride:p-Aminophenol (1:2) | 1/50th | 22 | 32 | | | |
| Paraquat dichloride:Catechol (1:1) | 1/50th | 32 | 46 | 47 | 53 | 51 |
| Paraquat dichloride:p-Aminobenzoic acid (1:2) | 1/50th | 28 | 48 | 53 | 46 | 41 |

The above tables show clearly that the complexes of this invention generally possess herbicidal activity of a higher degree, that is their herbicidal effect (phytotoxicity) is greater and more persistent than the bipyridylium quaternary salts by themselves.

The differences in activity between the results of Tests 1 and 2 is due to these tests being conducted at different times and under different environmental conditions, when, as is well known, the herbicidal effect of the bipyridylium herbicides can show marked variations.

Yet another advantage is that the complexes, and compositions containing them, may be transported in solid form in plastic or paper sacks rather than in relatively expensive watertight containers. Furthermore, they may be prepared without the use of special machinery (that is, for granulating).

A further useful advantage is that certain of the complexes of the invention appear, in certain circumstances, to be more readily taken up by, and translocated by, plants as is evidenced by the results of a test in which a single leaf of a plant was dipped in a solution of a complex of the invention, whereafter the plant was harvested and split up into several parts which were analysed for complex content.

The results show that application of bipyridylium salts in the form of complexes according to the invention results in decreased uptake of bipyridylium cation into the plant, but increased translocation (as determined from the analysis of separate parts of the plant), as may be seen from Table III below.

TABLE III

| Compound or complex | Rate of application, percent a.i. | Uptake, micrograms | Percent movement [1] |
|---|---|---|---|
| Paraquat dichloride | 0.5 | 208 | 15 |
| Paraquat dichloride: Phloroglucinol (1:3) | 0.5 | 153 | 22 |
| Paraquat dichloride:3,4-dihydroxybenzoic acid (1:1) | 0.5 | 100 | 42 |

[1] Uptake into rest of plant.

EXAMPLE 19

This example illustrates the preparation of solid herbicidal compositions according to the invention which contain a solid complex of a herbicidal bipyridylium quaternary salt and a wetting agent. The complexes used were those of Examples 1 to 4. In each preparation, an aqueous solution (2 ml.) of 1,1'-dimethyl-4,4'-bipyridylium dichloride containing 30% by weight of the bipyridylium cation was boiled, and the appropriate amount of complexing agent added at the boiling point, followed by 0.25 g. of a wetting agent comprising a condensate of 7 to 8 molecules of ethylene oxide with one molecule of p-nonylphenol. Magnesium sulphate (4.0 g.) was added before solidification took place and on cooling a solid block was produced. These blocks were found to dissolve fairly readily in water.

What is claimed is:
1. A solid herbicidal composition consisting essentially of a herbicidally effective amount of a solid complex of a herbicidal bipyridylium quaternary salt with from 1 to 4 molecular proportions of a complexing agent selected from the group consisting of nitrophenol, p-aminophenol, catechol, phloroglucinol, 3,4-dihydroxybenzoic acid, p-aminobenzoic acid, α-naphthylamine, o-aminobenzenethiol, 2-mercaptopyridine, and 2-mercaptobenzimidazole, in admixture with a compound selected from the group consisting of magnesium sulphate, sodium sulphate, potassium chloride, potassium nitrate or sucrose containing water of crystallization acquired during initial mixing of said compound with the complex, the herbicidal bipyridylium salt being selected from the group consisting of the chlorides, bromides, iodides, methylsulphates, nitrates, phosphates, sulphates, p-toluenesulphonates, phenolates and thiophenolates of herbicidal 4,4'-bipyridylium.
2. A solid herbicidal composition according to claim 1 which further includes a wetting agent.
3. A composition according to claim 1 wherein the said salts are selected from the group consisting of the chlorides or bromides of 1,1'-dimethyl-4,4'-bipyridylium.

References Cited

UNITED STATES PATENTS

| 3,245,909 | 4/1966 | Lowe | 252—51.5 |
| 3,251,839 | 5/1966 | Downes et al. | 71—94 |
| 3,405,135 | 10/1968 | Colchester | 71—94 |
| 3,413,237 | 11/1968 | Foroulis | 252—393 |

FOREIGN PATENTS

| 190,294 | 1/1967 | U.S.S.R. | 252—51.5 |
| 813,531 | 5/1959 | Great Britain. | |
| 913,413 | 12/1962 | Great Britain. | |
| 966,852 | 8/1964 | Great Britain | 71—94 |

OTHER REFERENCES

Desai et al.: "Inhibition of Copper Corrosion in NaOH Solutions (1966), CA66, p. 1331, No. 13573b (1967).

LEWIS GOTTS, Primary Examiner

G. HOLLRAH, Assistant Examiner

U.S. Cl. X.R.

11—92, DIG. 1; 260—247.2 B, 294.8 C, 294.8 G, 294.8 R, 295 AM, 295 S, 296 D